(12) United States Patent
Epstein et al.

(10) Patent No.: US 6,260,770 B1
(45) Date of Patent: Jul. 17, 2001

(54) SPRINKLER AND SEALING ASSEMBLY THEREFOR

(75) Inventors: Arnon Epstein; Yoel Zur, both of Hevel Korazim (IL)

(73) Assignee: Dan Mamtirim, Haelion (IL)

( * ) Notice: Subject to any disclaimer, the term of this patent is extended or adjusted under 35 U.S.C. 154(b) by 0 days.

(21) Appl. No.: 09/350,025

(22) Filed: Jul. 9, 1999

(30) Foreign Application Priority Data

Jul. 13, 1998 (IL) .......................................... 125332

(51) Int. Cl.$^7$ ........................................ B05B 3/04
(52) U.S. Cl. .................. 239/237; 239/264; 239/206; 277/446
(58) Field of Search ................ 239/225.1, 237, 239/264, 203–206; 277/511, 534, 943, 362, 373, 446, 465

(56) References Cited

U.S. PATENT DOCUMENTS

| | | | |
|---|---|---|---|
| Re. 25,942 | * 12/1965 | Reynolds | 239/237 X |
| 2,928,608 | * 3/1960 | Royer | 239/230 |
| 3,448,660 | * 6/1969 | Malcolm | 239/206 X |
| 3,523,647 | * 8/1970 | Radecki | 239/206 |
| 3,580,508 | * 5/1971 | Marandi | 239/206 X |
| 3,627,205 | * 12/1971 | Healy | 239/230 X |
| 3,655,249 | 4/1972 | Abel | 308/72 |
| 3,957,205 | * 5/1976 | Costa | 239/264 X |
| 3,968,934 | * 7/1976 | Healy | 239/230 |
| 4,392,753 | 7/1983 | Abel | 384/136 |
| 4,615,531 | * 10/1986 | Green | 277/446 |
| 4,971,256 | * 11/1990 | Malcolm | 239/230 |
| 5,738,446 | 4/1998 | Ghosh et al. | 384/112 |
| 5,769,544 | 6/1998 | Suzuki et al. | 384/115 |

FOREIGN PATENT DOCUMENTS 3528121   2/1987  (DE) .

* cited by examiner

Primary Examiner—Lesley D. Morris
(74) Attorney, Agent, or Firm—Ostrolenk, Faber, Gerb & Soffen, LLP

(57) ABSTRACT

A rotary sprinkler comprising a stationary housing, a distribution member rotatable with respect to said housing, a stationary fluid supply member being in flow communication with an inlet port of the housing and with the distribution member, and a sealing assembly, the sealing assembly comprises at least one sealing ring made of an essentially hard, abrasion resistant material, wherein one face of the sealing ring is rotationally fixed with respect to either the distribution member or one of the stationary housing and fluid supply member.

20 Claims, 6 Drawing Sheets

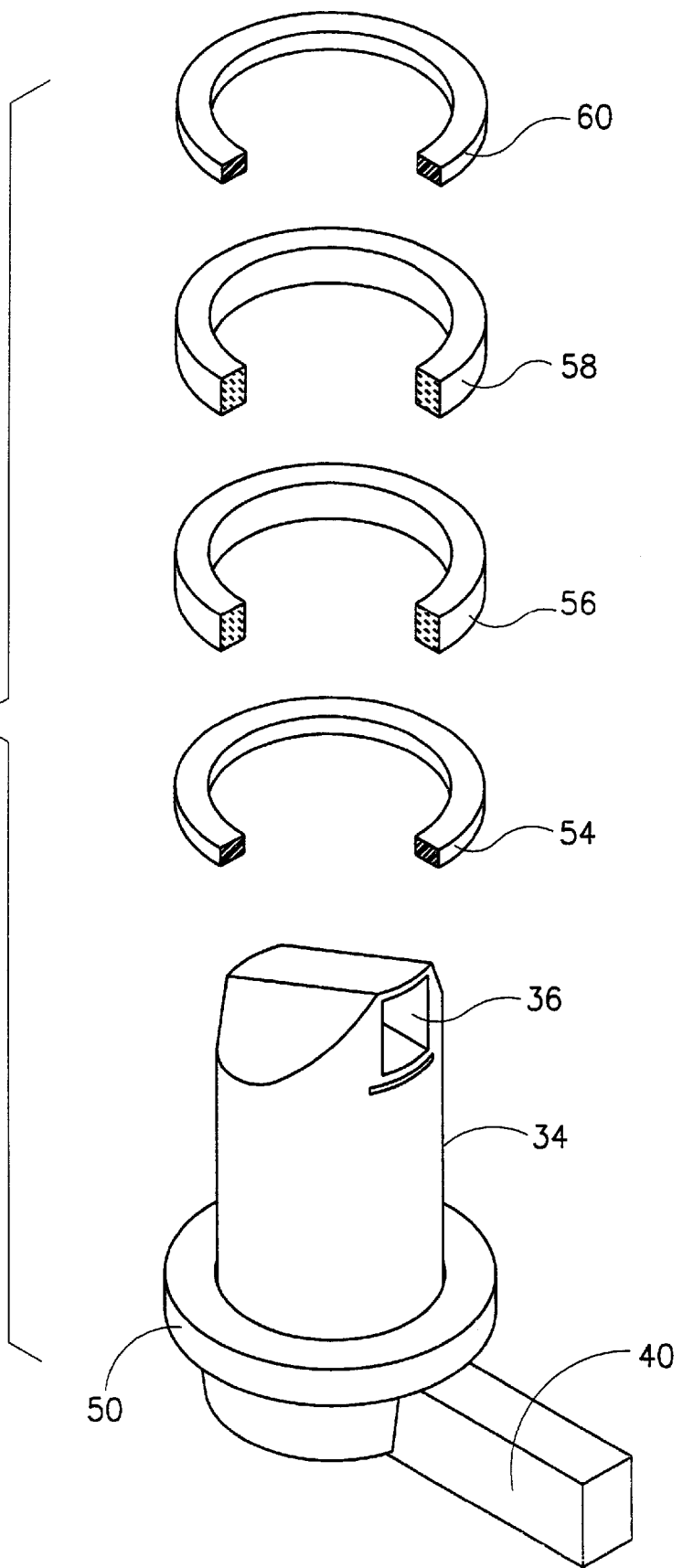

SPRINKLER AND SEALING ASSEMBLY THEREFOR

FIELD OF THE INVENTION

This invention is generally in the field of sprinklers and more specifically it is connected with sealing assembly for irrigation sprinklers.

BACKGROUND OF THE INVENTION

Sprinklers, and in particular irrigation sprinklers, are often supplied with unclear water containing particulate matter such as sand or grit and other dirt, i.e. weeds, algae, etc.

The second group of dirt matter, i.e. weeds, algae, etc. may cause a problem as far as operation and functioning of the sprinkler, namely, it may cause clogging of water passages or may halt rotation of a rotary sprinkler. Overcoming such a problem is usually by introducing filtering means on the water supply line and/or filtering means fitted at a water inlet of the sprinkler or integral with the sprinkler.

However, filters suitable for screening the second group of dirt, have a mesh which will trap large dirt but will not trap the particulate matter. On the other hand, introducing filter means with finer mesh will rapidly occlude.

The problem with the particulate material entering sprinklers is that it usually consists of essentially hard material, i.e. quartz, grains, etc. which abrade components of the sprinklers and in particular moving components thereof, which bear against other components and even more so at sealing assemblies of the sprinklers.

Accelerated wear of sealing components influences the sprinkler's performances, may halt rotation of a rotary sprinkler and may cause water leakage.

It is thus an object of the present invention to provide a sprinkler with an improved sealing assembly which essentially reduces or overcomes the above problems. By another aspect of the invention there is provide a sealing assembly for use with irrigation sprinklers.

The term sealing assembly as used herein the specification denotes a dynamic sealing and bearing assembly.

SUMMARY OF THE INVENTION

According to the present invention there is provided a rotary sprinkler comprising a stationary housing, a distribution member rotatable with respect to the housing, a stationary fluid supply member in flow communication with an inlet port of the housing and with the distribution member, and a sealing assembly.

The sealing assembly comprises at least one sealing ring made of an essentially hard, abrasion resistant material. One face of the sealing ring is rotationally fixed with respect to either the distribution member or one of the stationary housing and fluid supply member.

According to one preferred embodiment of the invention the sealing assembly has at least two stacked sealing rings made of an essentially hard abrasion resistant material. A first extreme sealing ring is rotationally fixed with respect to the distribution member and a second extreme sealing ring is rotationally fixed with respect to at least one of the stationary housing and fluid supply member.

Preferably, the sealing rings are made of ceramic materials such as, for example, Alumina or Zirconia. However, other materials may also be suitable.

Still preferably, surfaces of the sealing rings facing other sealing rings are finished so as to ensure sealing and essentially frictionless motion therebetween. Such finishing may be grinding or polishing, depending on the material of which the sealing rings are made and on operational conditions of the sprinkler, i.e. cleanliness of the water.

However, according to a different embodiment a surface of one or both of sealing rings facing each other may be formed with a narrowed portion engaging the other sealing rings for reducing friction therebetween, and to prevent sticking of the sealing rings to one another.

By still another preferred embodiment of the invention the sealing assembly, a stationary resilient seal is mounted intermediate each of the extreme sealing rings and a seal seating is formed at the respective stationary housing or fluid supply member. Such stationary resilient seals provide, on the one hand, resiliency which absorbs force components acting on the distribution member so as to maintain fluid-tight sealing and, on the other hand, absorb axial forces and tolerances applied on the distribution member. Such force components may be resultant of reactionary forces. The resilient seals also provide some biasing force for biasing the sealing rings to ensure good surface contact with one another.

The sealing assembly is mounted on a stem portion of either the rotary distribution or of one of the stationary members.

The resilient sealing rings also prevent rotation of the extreme sealing rings. Alternatively, by another embodiment of the invention, an external surface of each of the extreme sealing rings is formed with surface irregularities for rotationally engaging with a corresponding surface of the distribution member and the at least one of the stationary housing and fluid supply member, respectively.

By another aspect of the present invention there is provided a sealing assembly for a rotary sprinkler of the type comprising a stationary housing, a distribution member rotatable with respect to the housing and a stationary fluid supply member being in flow communication with an inlet port of the housing and with the distribution member.

The sealing assembly has at least one sealing ring made of an essentially hard, abrasion resistant material. One face of the sealing ring is rotationally fixed with respect to either the distribution member or one of the stationary housing and fluid supply member.

Preferably, the sealing assembly includes at least two stacked sealing rings made of a hard, abrasion resistant materral. A first extreme sealing ring is rotationally fixed with respect to the distribution member and a second extreme sealing ring is rotationally fixed with respect to at least one of the stationary housing and fluid supply member.

In accordance with a different embodiment of the present invention, the sealing assembly is suitable also for bearing a radial load, in additional to the axial load, as described hereinabove. In accordance with such an embodiment, there are provided at least two stacked sealing rings made of an essentially hard abrasion resistant material. The sealing assembly includes a first sealing ring rotationally fixed with respect to the distribution number and a second sealing ring rotationally fixed with respect to at least one of the stationary housing and fluid supply member. The sealing rings have an essentially T-like projection shape, having a first, lateral portion, for bearing axial loads and a second, cylindrical portion, for bearing radial loads.

The arrangement in accordance with this embodiment is such that the two rings are coaxially mounted and wherein facing surfaces of the first and second portions are finished so as to ensure sealing and essentially frictionless motion therebetween.

In accordance with a preferred embodiment of this application, the facing coaxial surfaces, adapted for bearing radial load, are formed with a plurality of axially extending recesses for handling particles of dirt. Other features of the sealing rings as indicated hereinabove with reference to other embodiments, apply too.

BRIEF DESCRIPTION OF THE DRAWINGS

In order to understand the invention and to see how it may be carried out in practice, some preferred embodiments will now be described, by way of non-limiting examples only, with reference to the accompanying drawings, in which:

FIG. 2A is a perspective, exploded view of the sealing assembly seen in FIG. 1;

FIG. 5 are detailed views of sealing rings used in the embodiment of FIG. 4, wherein:

DETAILED DESCRIPTION OF A PREFERRED EMBODIMENT

Figure 1:
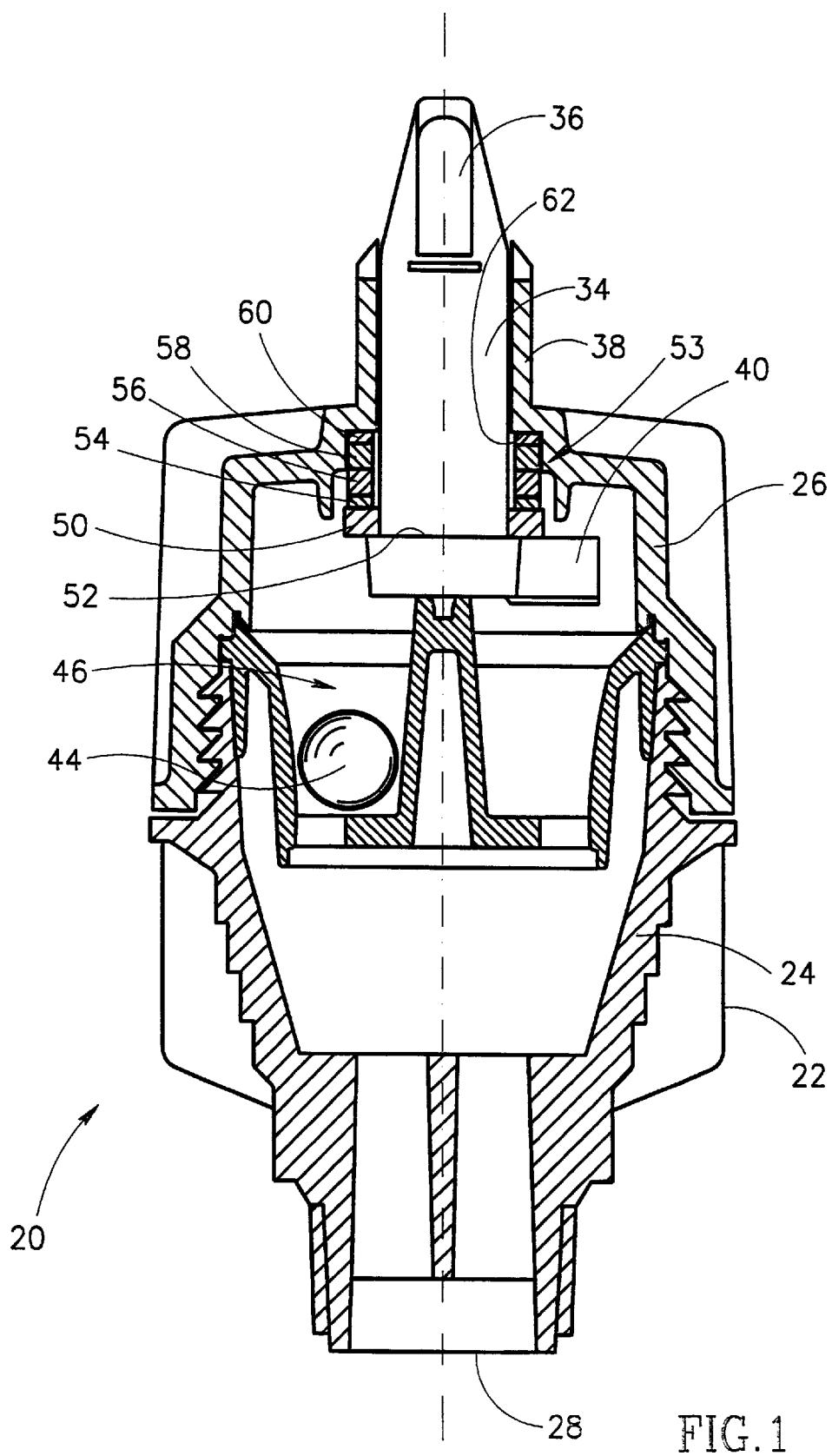
FIG. 1 is a longitudinal cross-section through a rotary sprinkle fitted with a sealing assembly in accordance with the present invention.

Attention is first directed to FIG. 1 of the drawings showing a sprinkler generally designated 20 comprising a housing 22 consisting of a casing 24 and a cover 26 screw-coupled thereto. Casing 24 is fitted with an inlet port 28 for connecting to a fluid supply line (not shown).

A rotary distribution member 34 has an outlet nozzle 36 projecting from a support bushing 38 integral with the cover 26. Distribution member 34 is formed at its lower end with a lateral projection 40 for imparting thereto rotational displacement by ball 44 of ball-type motor 46 as known per se. The ball-type motor 46 is fixedly received within casing 24 and constitutes a stationary fluid supply member.

As seen also in FIG. 2A, the rotary distribution member 34 is provided with an annular seat member 50 bearing on a shoulder 52 (seen in FIG. 1) above the lateral projection 40. It should be noted that seat member 50 may be integrally formed with the distribution member 34.

The sprinkler 20 is provided with a sealing assembly generally designated 53. Stacked on the rotary distribution member 34 are a first resilient seal ring 54, a pair of sealing rings 56 and 58 made of a ceramic material and a second resilient ring 60 bearing against an annular shoulder 62 formed within cover 26 of the housing 22.

Rings 54 and 60 are made of a water resistant resilient material such as rubber, whereas ceramic sealing rings 56 and 58 are made of a wear resistant material such as Alumina or Zirconia. The arrangement is such that upon tightening the cover 26 to casing 24 the resilient rings 54 and 60 frictionally engage with the seating 50 and annular shoulder 60, respectively, and on the other hand also frictionally engage with corresponding ceramic rings 56 and 58. Mating surfaces of the ceramic sealing rings 56 and 58 are preferably ground or polished to ensure sealing as well as smooth and essentially frictionless surface contact therebetween.

The above arrangement ensure on the one hand tight liquid sealing so as to prevent water from seeping between the rotary distribution member 34 and the support bushing 38, and on the other hand, provide a bearing-like support for the rotary distribution member 34, allowing it to freely rotate with respect to the housing. A significant advantage of this arrangement is that particulate material such as sand or grit which enter the sprinkler together with the water are ground between the sealing rings 56 and 58 and are then washed away by the water through nozzle 36.

It will be appreciated that owing to the fact that sealing rings 56 and 58 are made of a hard ceramic material these rings do not wear and do not lose their sealing property, nor does the shape change so as to maintain the bearing property.

Furthermore, the resilient rings 54 and 60 allow some flexibility in the axial and radial directions so as to absorb forces imparted to the rotary distribution member upon striking of the ball 44. The resilient rings 54 and 60 serve also as static seals for the respective ceramic sealing rings 56 and 58.

According to a specific embodiment (not shown) one or both of facing surfaces of sealing rings 56 and 58 are formed with a narrowed annular portion, for reducing rotary friction therebetween and for preventing sticking of the sealing rings to one another, in particular when the surfaces of the sealing rings are finished at high surface quality.

Figure 2B:
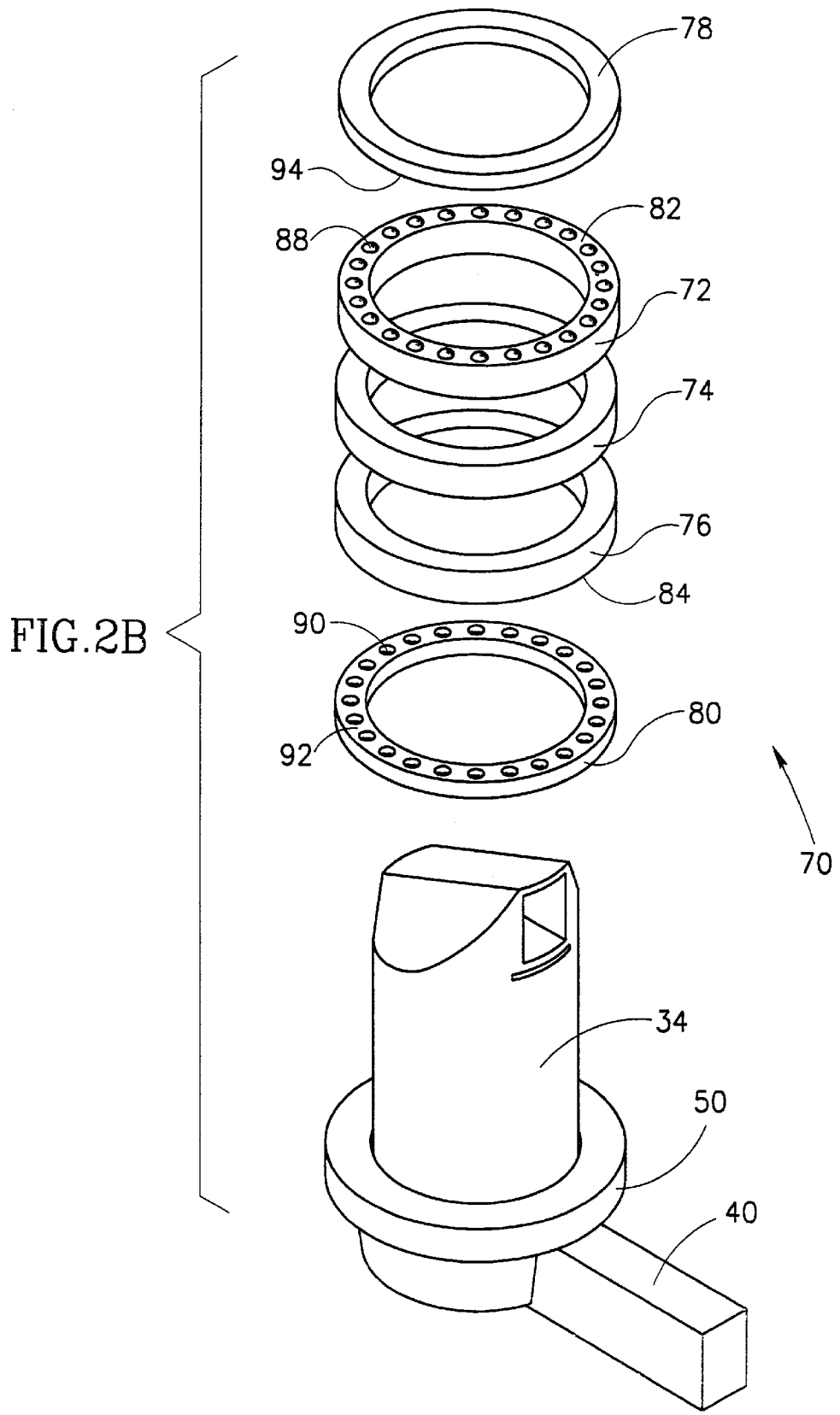
FIG. 2B is a perspective, exploded view of an embodiment of a sealing assembly for use in a sprinkler according to FIG. 1.

Attention is now directed to FIG. 2B illustrating a sealing assembly 70 which differs from the embodiment seen in FIGS. 1 and 2A in that it comprises three ceramic sealing rings 72, 74 and 76 stacked on the rotary distribution member 34 and received between two stationary resilient seals 78 and 80.

In order to ensure that the two extreme sealing rings 72 and 76 do not rotate together with the rotary distribution member 34 their extreme surfaces 82 and 84 respectively are formed with a plurality of bulges 88 (seen only in sealing ring 72) adapted for engagement with corresponding indentions 90 formed at facing surfaces 92 and 94 of resilient rings 80 and 78, respectively.

In the embodiment of FIG. 2B, both surfaces of the additional ceramic sealing ring 74 are smooth and cooperate with corresponding smooth surfaces of ceramic sealing rings 72 and 76, respectively for frictionless rotation therebetween.

It would be appreciated by a person versed in the art that the number of ceramic sealing rings may vary depending on the width of the ceramic sealing rings and of the resilient seals and on the space between the seating of the rotary distribution member and the cover of the casing, respectively. By one specific embodiment there may be provided only one sealing ring positioned between seatings integrally formed with the housing or fluid supply member and the distribution member. Alternatively, one or more seals may be provided intermediate the sealing ring and the housing or fluid supply member and the distribution member. The seatings and seals may be made of a variety of materials, e.g. polyurethane, polypropylene, resilient rubber material, etc.

Figure 3:
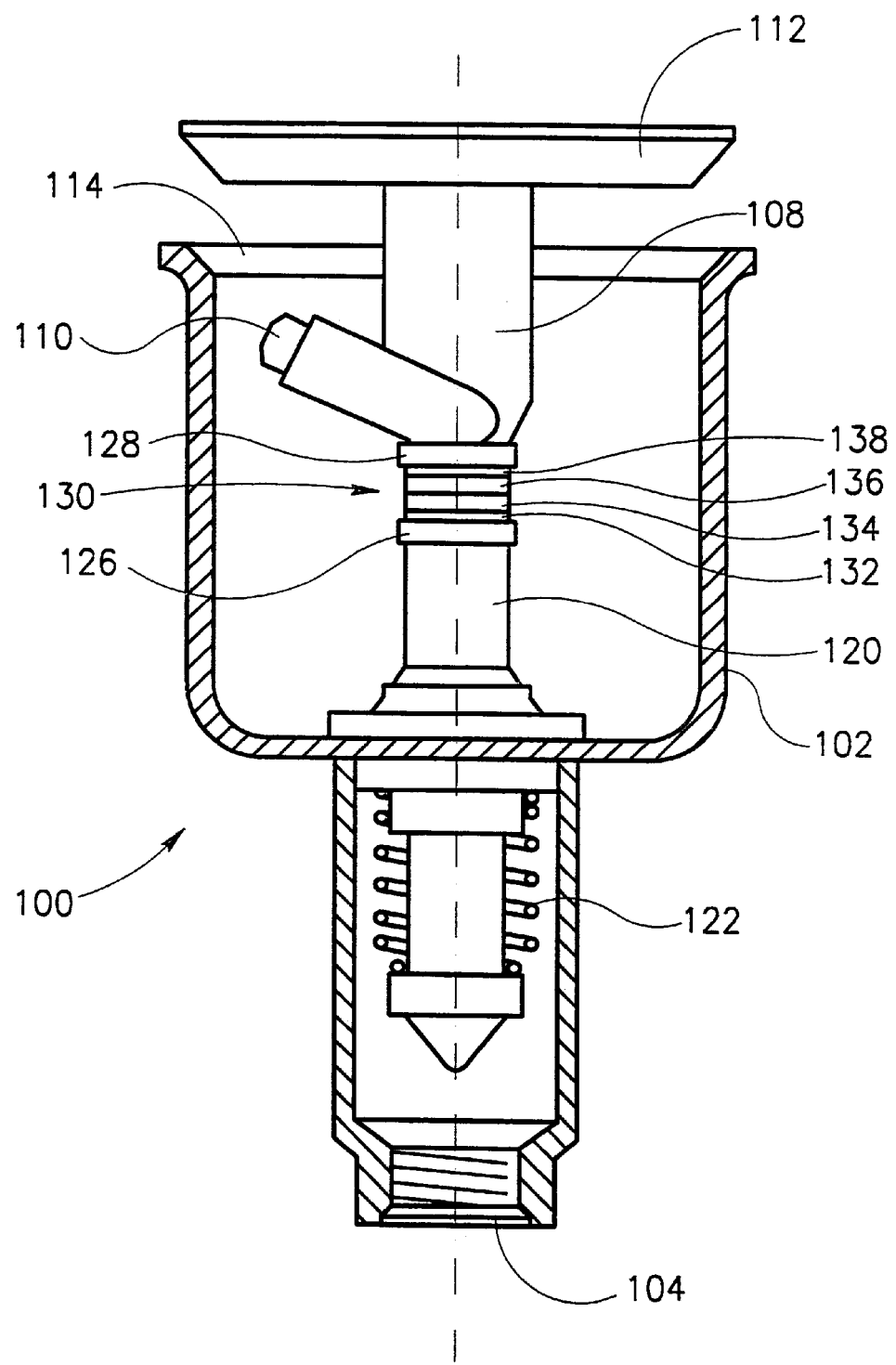
FIG. 3 is a longitudinal cross-sectional view through a pop-up rotary sprinkler fitted with a sealing assembly in accordance with the present invention.

Attention is now directed to FIG. 3 of the drawings illustrating a rotary sprinkler 100 in accordance with another embodiment of the present invention.

Sprinkler 100 comprises a housing 102 with an inlet port 104 fitted for screw coupling to a water supply line (not shown) and a pop-up rotary distribution member 108 fitted with an outlet nozzle 110 and a cover 112 for sealing opening 114 of housing 102. Rotary distribution member 108 is rotatably connected to a stationary fluid supply member 120 which is axially displaceable with respect to housing 102 and is spring biased to a retracted position by coiled spring 122, as known in the art.

A top end of the fluid supply member 120 is formed with a seat 126 and a bottom end of rotary distribution member 108 is formed with a sealing seat 128.

A sealing assembly, generally designated 130 comprises intermediate seats 126 and 128 are stacked as a resilient ring 132, a pair of ceramic sealing rings 134 and 136 and a second resilient seal 138.

As explained hereinabove in connection with the previous embodiments of FIGS. 1–3, sealing rings 134 and 136 are made of a hard material (typically, but not exclusively, a ceramic material) and are each frictionally engaged with the corresponding resilient ring 132 and 138 whereby essentially frictionless rotation occurs between mating surfaces of the sealing rings 134 and 136.

In the embodiment of FIG. 3, the sealing assembly 130 may be stacked on a shank portion of either the rotary distribution member 108 or at the fluid supply member 120.

Figure 4:
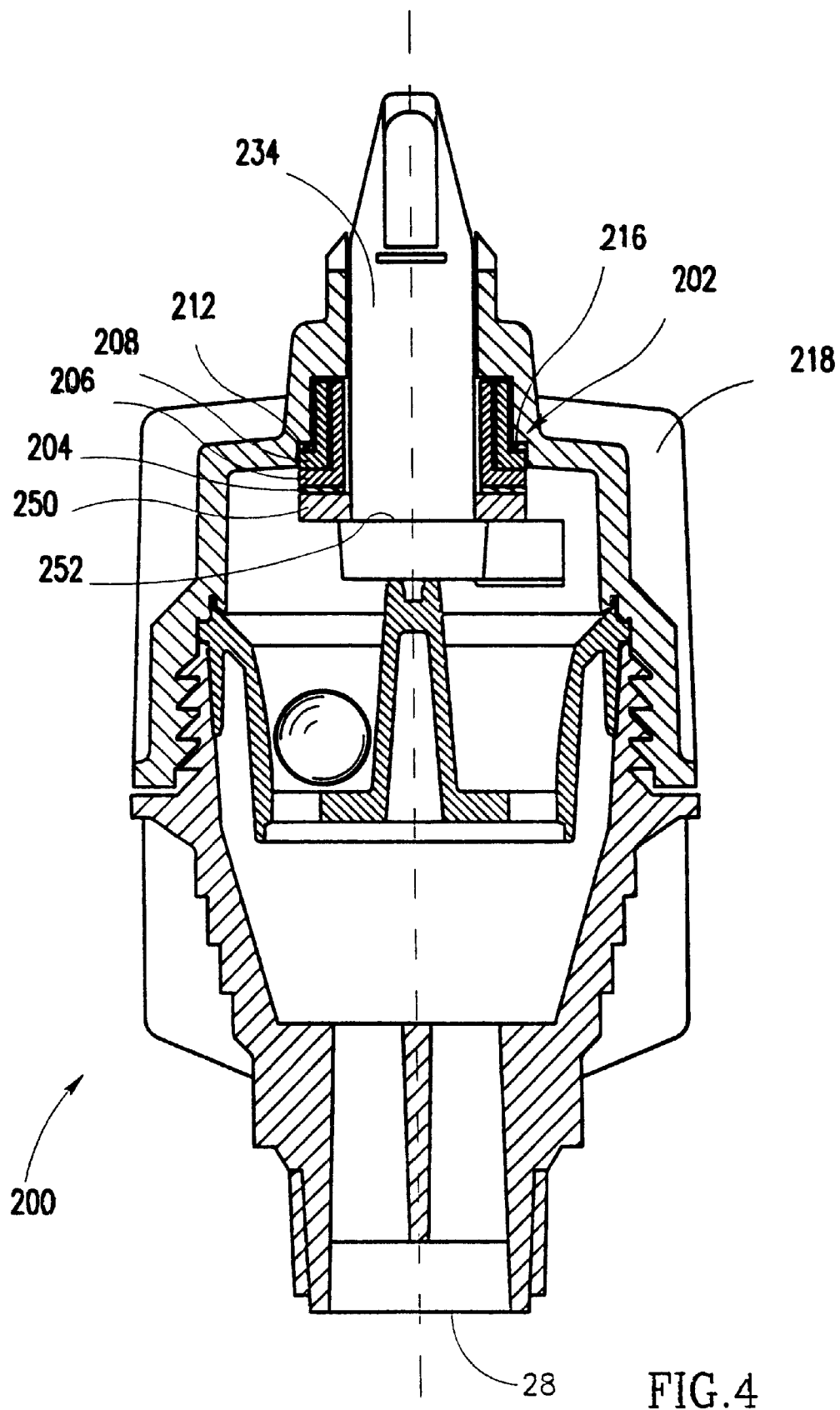
FIG. 4 is a longitudinal cross-section through a rotary sprinkler fitted with a sealing assembly in accordance with another embodiment with the present invention, suitable also for absorbing radial forces.

Attention is now directed to another embodiment of the invention illustrated in FIGS. 4 and 5, wherein a sealing ring assembly is provided for absorbing both axial and radial forces.

The sprinkler 200, seen in FIG. 4, is similar to the sprinkler 20 of FIG. 1 and the only difference resides in the sealing assembly generally designated 202 which comprises a first resilient sealing ring 204, a first T-shaped sealing ring 206 and a second T-shaped sealing ring 208 coaxially mounted over the first sealing ring 206. The term "T-shaped ring" denotes the projected shape of the rings 206 and 208, which in a sectioned state have an L-like shape about their longitudinal axis. A second resilient ring 212 is provided between an annular shoulder 216 formed within cover 218 of the housing and above a lateral portion of the second sealing ring 208 (see further details below).

Figure 5A:
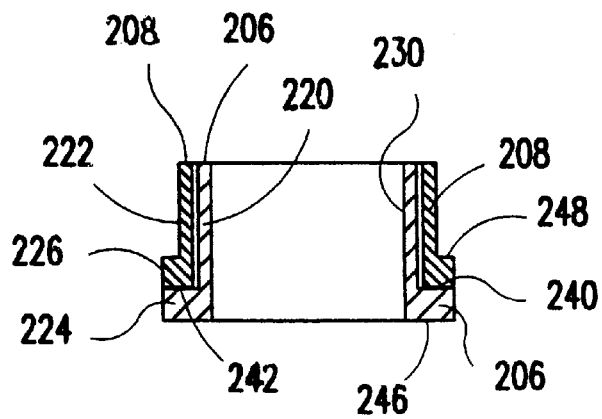
FIG. 5A is a longitudinal section through an assembled set of sealing rings.

In FIG. 5A, the first and second T-shaped sealing rings 206 and 208 are illustrated in their assembled position. Resilient sealing rings 204 and 212 are principally similar to rings 54 and 60 in FIGS. 1 and 2 and are thus not illustrated. As seen, each of the T-shaped rings 206 and 208 have a cylindric portion 220 and 222 and a lateral portion 224 and 226, respectively. The inner surface 230 of the cylindric portion 220 is adapted for absorbing radial forces applied by the distribution member 234 of sprinkler 200 (see FIG. 4) whilst the external surface 236 of the cylindric portion 220 (see FIG. 5D) is in close, smooth contact with the inner surface 238 of cylindric portion 222 of the second T-shaped ring 208.

Furthermore, the top surface 240 of the lateral portion 224 (of T-shaped ring 206) is essentially smooth and at essentially frictionless contact with surface 242 of lateral portion 226 (of T-shaped ring 208). This arrangement is suitable for bearing axial forces and is essentially similar to the arrangement of the embodiments seen in FIGS. 1 and 3. Resilient ring 204 (FIG. 4) is adapted for bearing against surface 246 (see FIG. 5A) and the second resilient ring 212 (FIG. 4) is adapted for bearing against the top surface 248 of lateral portion 226 (of the second T-shaped ring 208 (see FIG. 5A).

The arrangement disclosed hereinabove with connection to FIGS. 4 and 5 provides both axial and radial support wherein radial forces developing within the sprinkler as a result of unbalanced rotation of the distribution member 234 (due to reactionary forces) is handled by the cylindrical portions 220 and 222 of the sealing assembly.

As appreciated the bottom resilient rings 204 bear against an annular seat member 250 which in turn is mounted on a shoulder 252, as explained with reference to FIG. 1. Resilient ring 212 bear at its bottom surface against surface 248 of lateral portion 226 of the second T-shaped ring 208 whilst its top surface bears against surface 226 of housing 218.

Figure 5B:
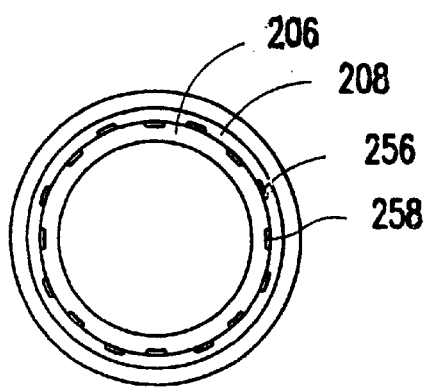
FIG. 5B is a top elevation of the assembled sealing rings seen in FIG. 5A.
Figure 5D:
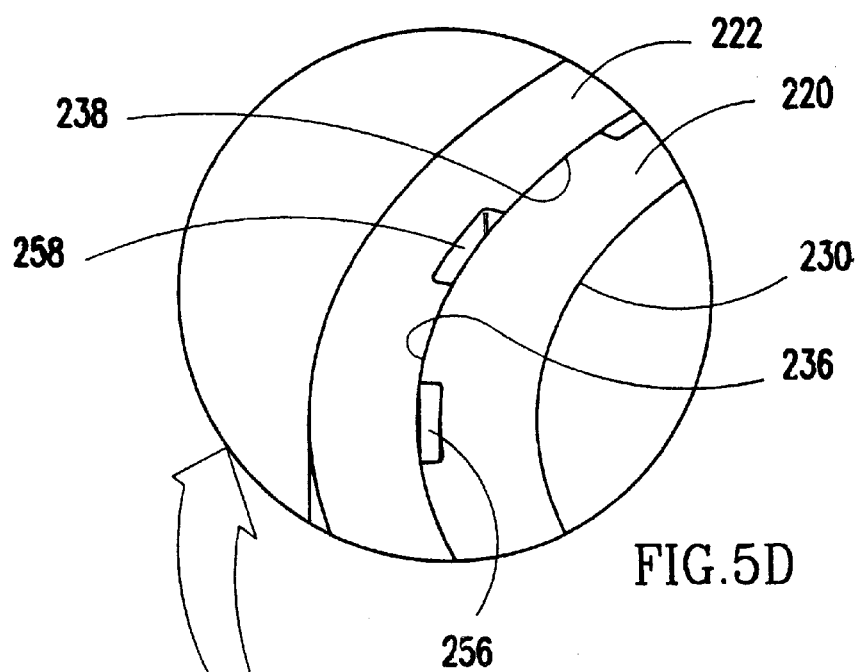
FIG. 5D is an enlargement of a portion illustrated in FIG. 5C.
Figure 5C:
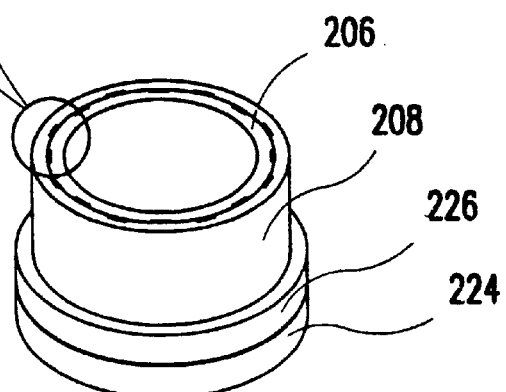
FIG. 5C is an isometric view of the rings seen in FIG. 5A.

Whilst in FIGS. 4 and 5A the coaxial cylindric portions 220 and 222 seem to be separate from one another, they are, in fact, in flush contact and further reference is made to FIGS. 5B–5D for understanding this arrangement. As can be seen in these figures, and most clearly in the enlarged portion of 5D, mating surfaces 236 and 238 of cylindric portions 220 and 222, respectively, are in flush contact with one another. Each of the surfaces 236 and 238 is formed with a plurality of axially extending grooves 256 and 258 which are provided for easy release of dirt particles penetrating between the coaxial portions. Accordingly, in FIGS. 4 and 5A, there seems to be a gap between the coaxial surfaces which as explained hereinabove, in fact does not exist.

While preferred embodiments have been shown and described, it is to be understood that it is not intended thereby to limit the disclosure, but rather it is intended to cover all modifications and arrangements falling within the spirit and the scope of the invention as defined in the appended claims.

What is claimed is:

1. A rotary sprinkler comprising:
   a stationary housing,
   a distribution member rotatable with respect to said housing,
   a stationary fluid supply member being in flow communication with an inlet port of the housing and with the distribution member, and
   a sealing assembly, comprising at least two sealing rings made of an essentially hard, abrasion resistant material, wherein one said sealing rings is rotationally fixed with respect to the distribution member and the other of said sealing rings is rotationally fixed with respect to one of the stationary housing and the fluid supply member.

2. A rotary sprinkler according to claim 1, wherein surfaces of the sealing rings facing other gasket rings are finished so as to ensure essentially frictionless motion therebetween.

3. A rotary sprinkler according to claim 2, wherein an external surface of sealing rings is formed with surface irregularities for rotationally engaging with a corresponding surface of a resilient ring engaging the distribution member and the at least one of the stationary housing and fluid supply member, respectively.

4. A rotary sprinkler according to claim 1, wherein the sealing assembly further comprises a stationary resilient seal mounted intermediate the sealing rings and a seal seating formed at the respective stationary housing or fluid supply member.

5. A rotary sprinkler according to claim 1, wherein the sealing rings are made of a ceramic material.

6. A rotary sprinkler according to claim 1, in which components of the sealing assembly are stacked over a shank portion either of the rotary distribution member or of one of the stationary housing and fluid supply member.

7. A rotary sprinkler according to claim 1, wherein irregularities are formed on external sealing ring surfaces for rotationally engaging with a corresponding surface of a resilient ring engaging the distribution member and the at least one of the stationary housing and fluid supply member, respectively.

8. A rotary sprinkler according to claim 1, wherein the sealing rings are adjacent one another, and a surface of at least one of the sealing rings facing each other is formed with a narrowed portion engaging the other sealing ring for reducing rotary friction between the facing surfaces of the sealing rings.

9. A rotary sprinkler according to claim 1, wherein the sealing rings have an essentially T-like projection shape, each having a first, lateral portion for bearing axial loads and a second, cylindrical portion, for bearing radial loads.

10. A rotary sprinkler according to claim 9, wherein the sealing rings are coaxially mounted and wherein facing surfaces of the sealing rings are finished so as to ensure essentially frictionless motion therebetween.

11. A rotary sprinkler according to claim 9, wherein at least one of the facing coaxial surfaces are formed with a plurality of axially extending recesses.

12. A rotary sprinkler according to claim 1, wherein facing surfaces of the sealing rings are finished so as to ensure essentially frictionless motion therebetween.

13. A rotary sprinkler according to claim 1, wherein the sealing assembly further comprises a stationary resilient seal mounted intermediate outermost sealing rings and a seal seating formed at the respective stationary housing or fluid supply member.

14. A rotary sprinkler according to claim 1, wherein facing surfaces of said at least two sealing rings are in flush engagement with one another.

15. A rotary sprinkler according to claim 1, wherein the distribution member passes through an opening formed in the stationary housing.

16. A rotary sprinkler according to claim 15, further comprising means for rotating the distribution member disposed within the stationary housing.

17. A rotary sprinkler according to claim 16, wherein the sealing assembly serves as a bearing between the distribution member and a bushing disposed on the stationary housing.

18. A sealing assembly for a rotary sprinkler of the type comprising a stationary housing, a distribution member rotatable with respect to said housing and a stationary fluid supply member being in flow communication with an inlet port of the housing and with the distribution member, said sealing assembly comprising at least two stacked sealing rings made of an essentially hard, abrasion resistant material, wherein one of said sealing rings is rotationally fixed with respect to the distribution member and the other of said sealing rings is rotationally fixed with respect to one of the stationary housing and the fluid supply member.

19. A sealing assembly according to claim 18, wherein the sealing rings are made of a ceramic material.

20. A sealing assembly according to claim 18, wherein components of the sealing assembly are stacked over a shank portion either of the rotary distribution member or of one of the stationary housing and fluid supply member.

* * * * *